May 11, 1954     S. V. COLLINS     2,678,017
STABILIZED FLOATING PLATFORM
Filed March 2, 1953     2 Sheets-Sheet 2
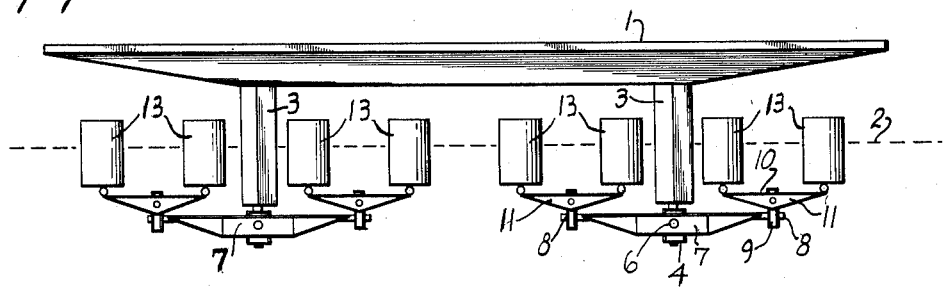
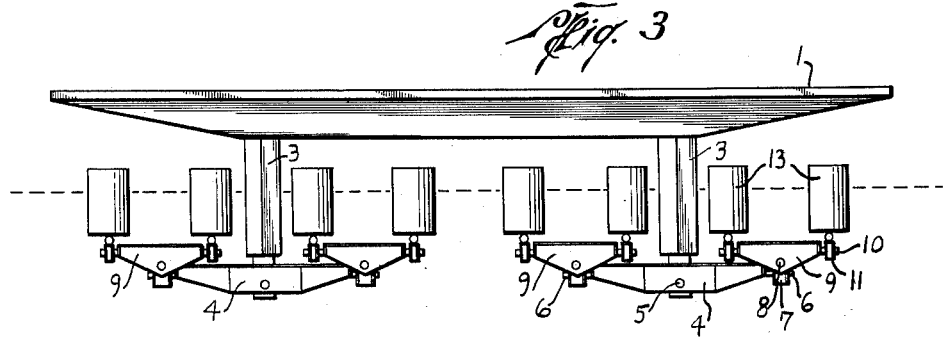
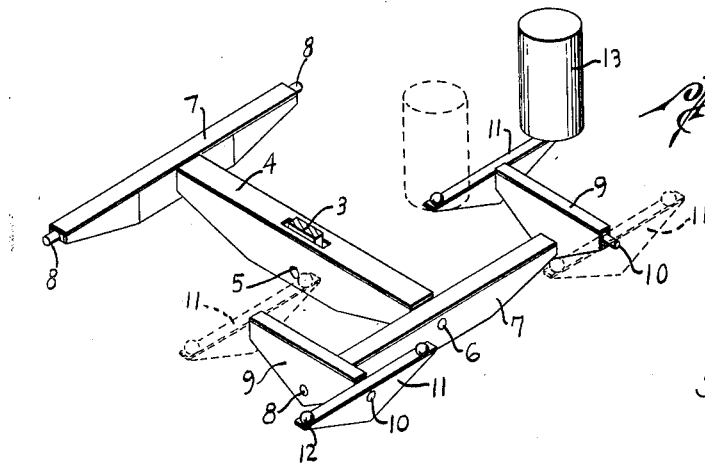
Samuel V. Collins
INVENTOR.
BY Geo. C. Helmig
+ Wm. E. Ford
ATTORNEYS

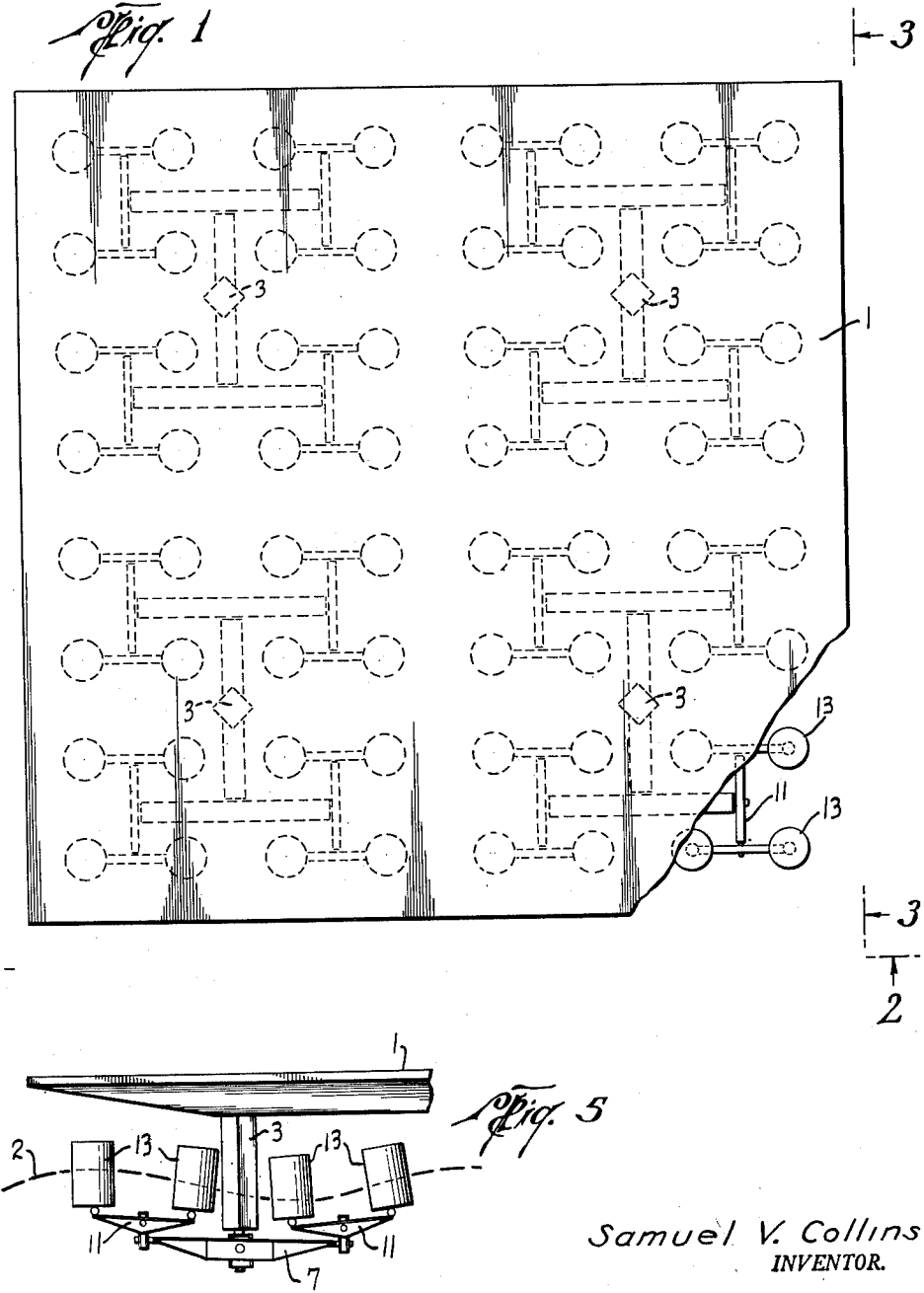

Patented May 11, 1954

2,678,017

UNITED STATES PATENT OFFICE 2,678,017

STABILIZED FLOATING PLATFORM

Samuel V. Collins, Port Lavaca, Tex.

Application March 2, 1953, Serial No. 339,681

7 Claims. (Cl. 114—43.5)

This invention relates to marine structures, and more particularly to a float load-carrier having a system of floats arranged for individual and relative float motion in a fashion to maintain the carriage substantially level regardless of surface roughness of a body of water on which the carrier rides.

In a specific embodiment of the invention there is contemplated the provision of a work platform or deck to be anchored at a selected spot in the sea or any body of water to serve as a storage base for supplies or as a construction stage where work is being done, either below or above the water's surface, or as a platform of sufficient width and length to enable landings and take-offs of aircraft.

It is an object of the invention to provide an improved float arrangement involving the use of a large number of buoyant elements each of which individually follows the rise and fall of the surface waves or undulations, but which are so interconnected with one another and with the main platform as to counteract one another or minimize the net effect on the platform, whereby the platform surface remains at a substantially constant level with minimum variation in height and tilt.

A further object of the invention is to provide a platform floating support utilizing a number of groups of fulcrumed balance beams successively joined in pairs to preceding beams and with the primary beam of each group mounted on the platform understructure, and with the most remote beams carrying the float elements, so that the rise of one float concurrently with the fall of a companion float on the opposite end of the same beam is compensated for with no transmission of level change, while the concurrent rise or fall of both floats is reduced through the leverage action in the beam succession and in the concurrent rise or fall of other floats associated with other beams of the group. If the wave formation normally present in a given body of water remains substantially constant, it will be possible to predetermine the length of the lever arms and the spacings between sets of floats to insure the rise and fall of one float in reverse relation to the rise and fall of the companion float for complete counteraction.

The invention will be better understood upon reference to the accompanying drawing, wherein:

Fig. 1 is a top plan view of a large load-carrying deck with one corner broken away;

Figs. 2 and 3 are end and side elevations looking in the directions of the arrows on lines 2—2 and 3—3, respectively, of Fig. 1;

Fig. 4 is a perspective view showing portions of an equalizing beam system; and

Fig. 5 is an elevation illustrating the action of the floats under wave motion.

Referring to the drawing, the platform indicated at 1 may be variously constructed, but is shown as having a flat deck or plane horizontal upper surface which lies above the surface 2 of the body of water. A calm sea is indicated by a straight broken line of water surface 2 in Figs. 2 and 3, and a rough sea is shown by the wavy broken line in Fig. 5.

The understructure of the platform may be a suitable framework properly braced and projected below the surface of the sea. A simplified arrangement of the understructure may consist of a number of spaced-apart vertical posts 3, and the number of posts employed will depend upon the area of the carrier, there being four of such vertical posts in the arrangement shown. Each post 3 is joined to a system of balance beams. The first or primary beam 4 is the strongest and longest of the group, and is centrally pivoted on a transverse horizontal axle 5 carried at the bottom of a post 3, so that it extends substantially perpendicularly to the vertical axis of the post. At opposite ends the beam 4 terminates in longitudinally disposed axle pins 6—6, to provide fulcrum axes perpendicular to the vertical axis of the post and to the horizontal axis of the main supporting axle 5. On each axle 6 is pivoted a secondary rocking beam 7 which extends transversely of the primary beam 4, and it also terminates at opposite ends in axle pins 8—8, extending longitudinally of the beam 7. These axle pins 8 thus extend in spaced parallel relation with the main axle 5, and each carries a centrally mounted equalizer beam or cross plate 9. The secondary equalizer beam 9 terminates at opposite ends in longitudinally extending axles 10—10, which are parallel to the axis of the fulcrum axle 6. On these oppositely disposed axles 10—10 are mounted the central portions of a pair of secondary beams or cross plates 11, which constitute the final and shortest beams of the group. Thus it will be seen that there are listed in the drawing four sets of equalizer beam systems, and each set includes one primary beam 4, two secondary beams 7, four secondary beams 9, and eight secondary beams 11, and that the result of the interpivoted levers will be a division and subdivisions of the force and range of movement transmitted.

On the opposite ends of the final beam 11 are mounted a pair of floats, and the mounting preferably is of a universal swivel character. For that purpose, a ball stud 12 may be secured at each end of the beam for projection in the corresponding ball socket carried by the float. The floats illustrated may be hollow cylindrical containers 13 extending upright and preferably being sealed to enclose a body of air or the like for purposes of buoyancy.

As will be best appreciated from an inspection of Figs. 4 and 5, a roughness of the surface will cause rise and fall of the buoyant members separately in relation to one another, and the rise of one coincident with the fall of the other through a given range will merely rock the secondary beam 11 without transmitting any movement therebeyond. If a given pair of floats on one lever 11 rise or fall in unison and at the time of an opposite movement of the floats associated with a like beam 11 of the pair on opposite ends of the secondary beam 9, the result is merely a rocking of the beam 9 without any further transmission of the movement. In like manner, if a group of four floats on one end associated with the levers pivoted at one end of the beam 7 move up and down in unison at the time of a movement in the opposite direction of a set of four floats associated with levers pivoted on the opposite end of the beam 7, then the beam 7 merely swings around its pivot without further transmission of movement. The same thing applies with reference to the operation of the main beam 4, when all the floats on one end of the beam 4 move in opposite direction to all the floats on the other end of the primary beam. Thus, by the combination of levers in succession, there can be accommodated waves of varying length in the sense that the floats can ride up and down on the crests and troughs with minimum transmission of motion to the inner structure of the platform, and the platform will tend to remain on a constant level. Movement of each float individually will often vary in range in relation to unisonal movement of other floats, but the net effect of the equalizer beam arrangement will be to reduce the range of toss at the primary beam mounting axle.

What is claimed is:

1. A multi-differential marine stabilizer comprising a platform, a plurality of posts connected to the underside of said platform and extending with axes perpendicular to said platform, an axle on each post with its axis perpendicular to the post axis, a first beam centrally pivotally mounted on said post axle, an axle on each end of said first beam perpendicular to said post and post axle axes, a second beam centrally pivotally mounted on each first beam axle, an axle on each end of said second beam parallel to said post axle axis, a first cross-plate centrally pivotally mounted on each second beam axle, an axle on each end of said first cross-plate parallel to the axes of said first beam axles, a second cross-plate centrally pivotally mounted on each first cross-plate axle, universal connection means on each end of said second cross-plate and on the upper surface thereof, and a float means universally mounted on each universal connection means.

2. A multi-differential marine stabilizer comprising a platform, a plurality of posts connected to the underside of said platform and extending with axes perpendicular to said platform, an axle on each post with its axis perpendicular to the post axis, a first beam centrally pivotally mounted on said post axle, an axle on each end of said first beam perpendicular to said post and post axle axes, a second beam centrally pivotally mounted on each first beam axle, an axle on each end of said second beam parallel to said post axle axis, a cross-plate centrally pivotally mounted on each second beam axle, swivel connection means on each end of said cross-plate, and float means mounted through each swivel connection means.

3. A multi-differential marine stabilizer comprising a platform, a plurality of posts connected to the underside of said platform and extending with axes perpendicular to said platform, an axle on each post with axis perpendicular to said post axis, a first beam centrally pivotally mounted on said post axle, an axle on each end of said first beam extending longitudinally thereof and perpendicular to said post and post axle axes, a second beam projected at right angles to the first beam and centrally pivotally mounted on each first beam axle, connection means carried on each end of said second beam, and a float means mounted on each connection means.

4. A multi-differential marine stabilizer comprising a load carrier, a plurality of dependent structures on the underside of said carrier, an axle on each dependent structure having a substantially horizontal axis, a beam centrally pivotally mounted on each axle, an axle on each end of said first beam perpendicular to the first axle axis, a second beam centrally pivotally mounted on each first beam axle, an axle on each end of said second beam parallel to said first axle axis, a first cross-plate centrally pivotally mounted on each second beam axis, an axle on each end of said first cross-plate parallel to the axes of said first beam axles, a second cross-plate centrally pivotally mounted on each first cross-plate axle, and a float means as a part of each of the second cross-plates.

5. A multi-differential marine stabilizer comprising a load carrier, a plurality of supporting axles carried by said load carrier, each with its axis extending substantially horizontally, beam member series each comprising a group of beam members successively positioned at right angles to one another and centrally pivotally mounted on axles which extend in succession alternately at right angles to and parallel to said supporting axle, with the supporting axle of a given group being the axle on which the innermost beam member of each beam member group is centrally pivotally mounted, and a float means mounted at each end of the outermost beam member of each beam member group.

6. In a marine float of the character described, a load-carrying deck and a float system therefor comprising a series of groups of equalizer beams, each of said groups including a primary equalizer beam and a succession of pairs of secondary equalizer beams, a horizontally hinged connection between the deck and the primary equalizer beam intermediate its ends, the pairs of secondary equalizer beams being arranged in succession and having horizontally hinged connections intermediate their ends to opposite ends of the primary equalizer beam or successively to opposite ends of other secondary equalizer beams and each hinge connection in succession having its axis extending at right angles to the preceding hinge connection, and buoyant elements swivelly connected at opposite ends to the final pair of the succession of secondary equalizer beams.

7. In a marine float, a load-carrying deck, a float system therefor comprising a series of groups of balance levers, each of said groups including a primary balance lever having fulcrum connection intermediate its ends with the deck, a pair of secondary balance levers angularly disposed to the primary balance lever and having intermediate fulcrum connections with the primary balance lever in spaced relation on opposite sides of and out of parallel with said intermediate fulcrum connection and other pairs of secondary balance levers, each angularly disposed to a preceding secondary balance lever and having intermediate fulcrum connection with preceding secondary balance levers of the group at spaced-apart points on opposite sides of and out of parallel with said last mentioned intermediate fulcrum connection, and floats included with the final pairs of secondary balance levers.

References Cited in the file of this patent

UNITED STATES PATENTS

| Number | Name | Date |
|---|---|---|
| 1,511,153 | Armstrong | Oct. 7, 1924 |
| 2,219,647 | Degallier | Oct. 29, 1940 |
| 2,313,295 | Herail | Mar. 9, 1943 |